US005674377A

United States Patent [19]
Sullivan, III et al.

[11] Patent Number: 5,674,377
[45] Date of Patent: Oct. 7, 1997

[54] METHOD OF TREATING SOUR GAS AND LIQUID HYDROCARBON

[75] Inventors: Daniel S. Sullivan, III; Allan R. Thomas, both of Houston; Mark A. Edwards, La Porte; Grahame N. Taylor; Paul Yon-Hin, both of Houston; Juan M. Garcia, III, Sugar Land, all of Tex.

[73] Assignee: Nalco/Exxon Energy Chemicals, L.P., Sugarland, Tex.

[21] Appl. No.: 491,396

[22] Filed: Jun. 19, 1995

[51] Int. Cl.⁶ .................................................. C10G 45/00
[52] U.S. Cl. ...................... 208/208 R; 208/236; 423/228
[58] Field of Search .............................. 208/207, 208 R; 423/228, 236

[56] References Cited

U.S. PATENT DOCUMENTS

| | | | |
|---|---|---|---|
| 3,884,917 | 5/1975 | Ibbotson | 260/248 |
| 3,915,970 | 10/1975 | Limaye et al. | 260/248 |
| 4,605,737 | 8/1986 | Au | 544/215 |
| 4,631,138 | 12/1986 | Johns et al. | 252/8.555 |
| 4,710,305 | 12/1987 | Allison | 210/747 |
| 4,748,011 | 5/1988 | Baize | 423/228 |
| 4,753,722 | 6/1988 | Humble et al. | 208/207 |
| 4,778,609 | 10/1988 | Koch et al. | 252/325 |
| 4,978,512 | 12/1990 | Dillon | 423/226 |
| 5,128,049 | 7/1992 | Gatlin | 210/752 |
| 5,169,411 | 12/1992 | Weers | 44/421 |
| 5,347,004 | 9/1994 | Rivers et al. | 544/180 |
| 5,354,453 | 10/1994 | Bhatea | 208/236 |
| 5,480,860 | 1/1996 | Dillon | 423/228 |
| 5,508,012 | 4/1996 | Trauffer | 423/208 |

FOREIGN PATENT DOCUMENTS 40273004  3/1992  Germany.

Primary Examiner—Helane E. Myers
Attorney, Agent, or Firm—R. L. Graham

[57] ABSTRACT

Gaseous or liquid hydrocarbon is treated with a scavenging compound comprising an oil soluble 1,3,5-trihexahydro-1,3,5-tert.-butyltriazine. The compound is an effective nonregenerated scavenger for oil field produced fluids, particularly sour hydrocarbon liquids.

9 Claims, No Drawings

METHOD OF TREATING SOUR GAS AND LIQUID HYDROCARBON

BACKGROUND OF THE INVENTION

This invention relates generally to the treatment of sour gas and liquid hydrocarbon to remove or reduce the levels of hydrogen sulfide therein. In one aspect, the invention relates to the treatment of sour gas and oil streams flowing in a flow line. In another aspect, the invention relates to the use of nonregenerative scavengers to reduce the levels of hydrogen sulfide in natural gas and liquid hydrocarbons. In still another aspect, the invention relates to the use of a specific oil soluble hexahydrotriazine as an $H_2S$ scavenger for oil field produced fluids, particularly oil streams.

The toxicity of hydrogen sulfide in hydrocarbon streams is well known in the industry and considerable expense and efforts are expended annually to reduce its content to a safe level. Many regulations require pipeline gas to contain no more than 4 ppm hydrogen sulfide.

In large production facilities, it is generally more economical to install a regenerative system for treating sour gas streams. These systems typically employ a compound used in an absorption tower to contact the produced fluids and selectively absorb the hydrogen sulfide and possibly other toxic materials such as carbon dioxide and mercaptans. The absorption compound is then regenerated and reused in the system. Typical hydrogen sulfide absorption materials include alkanolamines, PEG, hindered amines, and the like.

However, during a development stage of a field or in small producing fields where regenerative systems are not economical, it is necessary to treat the sour hydrocarbon production with nonregenerative scavengers.

Based on an article appearing in the *Oil & Gas Journal*, Jan. 30, 1989, nonregenerative scavengers for small plant hydrogen sulfide removal fall into four groups: aldehyde based, metallic oxide based, caustic based, and other processes. In the removal of hydrogen sulfide by nonregenerative compounds, the scavenger reacts with the hydrogen sulfide to form a nontoxic compound or a compound which can be removed from the hydrocarbon. For example, in the formaldehyde type reaction, the reaction produces a chemical complex known as formthionals (e.g., trithiane).

As described in detail below, the present invention employs a nonregenerative scavenger which are of the aldehyde type. Aldehyde scavengers of the prior art include low molecular weight aldehydes and ketones and adducts thereof. The low molecular weight aldehydes may also be combined with an alkyl or alkanolamine as disclosed in U.S. Pat. No. 4,748,011. Other aldehyde derived scavengers include the reaction product of low molecular weight alkanolamines and aldehydes disclosed in U.S. Pat. No. 4,978,512. PCT Application WO 92/01481 discloses a method of reducing sulphides in a sewage gas using certain tri-substituted-hexahydro-s-triazines. German reference DE4027300 discloses a regenerative solvent for removing $H_2S$ and mercaptans. U.S. Pat. No. 5,347,004 discloses the use of 1,3,5 alkoxyalkylene hexahydro triazines.

SUMMARY OF THE INVENTION

In accordance with the method of the present invention, sour produced fluid such as $H_2S$ sour gas or liquid hydrocarbons are treated with an aldehyde type scavenger to reduce the level of $H_2S$ and mercaptans therein. The scavenger is a 1,3,5-tri-hexahydro-1,3,5-tri(tert.butyl)triazine.

The substituted-hexahydro-triazine may be manufactured by reacting a low molecular weight hindered primary amine with formalin or a lower aldehyde such as formaldehyde to form an aqueous solution of the hexahydro-triazine. The water may then be distilled off leaving the hexahydro-triazine which can be used in neat form or dissolved in a suitable solvent.

The method of the present invention involves adding the hexahydro-triazine scavenger described above to any gas or liquid hydrocarbon containing $H_2S$ and/or mercaptans in a sufficient quantity to effectively reduce the levels of reactive S therein. The method may also be employed by passing the sour gas through an absorption tower containing a solution of the scavenger.

DESCRIPTION OF THE PREFERRED EMBODIMENTS

The method of the present invention may be used in the treatment of sour gas and oil production streams, as well as in petroleum (e.g. crude oil, asphalts, and refined products) contained in storage tanks, vessels, pipelines, etc.

As mentioned above, the scavenging composition useful in the method of the present invention is the reaction product of a tert.-butylamine and an aldehyde. The preferred aldehyde is formaldehyde which can be in the form of formalin or paraformaldehyde. Spectroscopic data indicate that the main product is a 1,3,5-hexahydro-1,3,5-tert-butyltriazine. The proposed reaction therefore involves a condensation step followed by a cyclization step to generate a hexahydrotriazine as the main product. For convenience, this compound is referred to herein as "hexahydro-triazine", unless otherwise indicated to distinguish between other triazines.

In carrying out the reaction to prepare the preferred hexahydro-triazine, the tert-butylamine is added slowly to a concentrated aqueous solution of the formaldehyde (formalin) and the stoichiometry is maintained to so that there is an exact equivalent to a slight excess of the amine at the end of the reaction. Typically, a molar ratio of at least 1.00 to 1.05 of the amine to the formaldehyde is preferred for the overall process to form the tert-butyltriazine quantitatively (in excess of 90% yield). For the reaction to go to completion satisfactorily and to yield the tert-butyltriazine, careful control of the reaction conditions must be observed in order to avoid side-reactions. During the slow addition of the amine it is desirable to maintain a reaction temperature below 46° C.

The hexahydro-triazine may also be prepared by the reverse addition of formaldehyde or paraformaldehyde to the tert-butylamine to yield the same result, provided the temperature is maintained below 46° C. and provided the stoichiometry of the overall process is as described above.

Although the hexahydro-triazine can be used as an aqueous solution as prepared, its use in the neat form after the removal of the water is desirable. The neat product can then be formulated in a solvent or diluent system such as alcohols, glycol ethers, or an oil solvent such as heavy aromatic naphtha, alkanes, aromatics, etc. The different formulations of the tert-butyltriazine have been tested and shown to offer great versatility in scavenging hydrogen sulfide in oil systems. The concentration of the hexahydro-triazine in the solvent or diluent may vary within the wide ranges from 5 to 95 wt %, with 20 to 80 wt % being preferred. The presence of the diluent or solvent compatible with the triazine and the oil being treated helps in dispersing the scavenger throughout the oil, particularly for heavy crude streams.

Operations

In carrying out the method of the present invention, the scavenging composition is added to the hydrocarbon oil or gas stream in a concentration sufficient to substantially reduce the levels of $H_2S$ and/or mercaptans therein. In gas, generally from 0.01 to 0.12, preferably from 0.02 to 0.10, most preferably from 0.04 to 0.08 gallons of scavenger product (based on actives) per MMSCF for each ppm of $H_2S$ removed will be sufficient for most applications. The treatment may also be based on weight of $H_2S$ in the gas. From 1 to 50, preferably 2 to 20 pounds and most preferably from 4 to 10 pounds of hexahydro-triazine per pound of $H_2S$ removed will normally be required in oil or gas streams. Typically, from 50 to 3000 ppm of the scavenger in the stream will be used, preferably 1000 ppm or less.

In treating hydrocarbon streams, the scavenging compound contained in a solvent, such as a mutual solvent or aromatic solvent, may be injected by conventional means such as a chemical injection pump or any other mechanical means for dispersing chemicals in the stream. The injection may be in the flow lines or the gas may be passed through an absorption tower containing a solution of the hexahydro-triazine.

In addition to the hexahydro-triazines described above, the chemical formulations may also contain other compounds such as ethoxylated alcohols, ethoxylated phenols, sulfates of ethoxylated alcohols and phenols, amine dispersants, corrosion inhibitors, and the like. The most preferred scavenger formulation comprises 20–80 wt % actives (hexahydro-triazines). The 100% wt % active (hexahydro-triazine) can be successfully used as is without formulation.

The $H_2S$ scavenging ability of the hexahydro-triazine is believed to be due to its reaction with hydrogen sulfide to produce sulfur containing organic compounds such as dithiazines.

EXPERIMENTS

Experiments were carried out to demonstrate the effectiveness of the 1,3,5-hexahydro-1,3,5-tert.-butyltriazines vis-a-vis other scavengers. The samples used in the comparative experiments are described in TABLE I.

TABLE I

| Sample | |
|---|---|
| Sample A | 1,3,5-hexahydro-1,3,5-tert.-butyltriazine (prepared with formalin) |
| Sample B | 1,3,5-hexahydro-1,3,5-tert.-butyltriazine (prepared with paraformaldehyde) |
| Comparative Samples | |
| Sample C-1 | 1,3,5-hexahydro-1,3,5-sec-butyltriazine |
| Sample C-2 | 1,3,5-hexahydro-1,3,5-n-butyltriazine |
| Sample C-3 | Simple blend of 1,3,5-hexahydro-1,3,5-methoxypropyltriazine and dimethyl (2-ethylhexyl) tallow ammonium sulfate (Dispersant) |
| Sample C-4 | 1,3,5-hexahydro-1,3,5-methoxypropyltriazine |
| Sample C-5 | Commercial aldehyde type scavenger |
| Sample C-6 | Methanolic amine resin |
| Sample C-7 | Reformulated amine resin |
| Sample C-8 | Condensate of aldehyde and amine |
| Sample C-9 | Condensate of aldehyde and amine |
| Sample C-10 | Condensate of aldehyde and alkanolamine |
| Sample C-11 | Simple blend of an amine resin and phenoxy polyethylene glycol (Dispersant) |

PREPARATION OF SAMPLES

The 1,3,5-hexahydro-1,3,5-tert.-butyltriazines (Samples A and B) and the other sec-butyltriazines and n-butyl triazines (Samples C-1 and C-2) were prepared as follows:

Sample A: The tert.-butyltriazine was prepared by slowly adding 2.1 moles (153.59 grams) of tert.-butyl amine into 2.0 moles of formaldehyde as 165.31 grams of 37% formalin solution with continuous stirring. The preparation was carried out in a round bottom reaction flask equipped with an additional funnel, a magnetic stirrer, and a cooling bath. The tert.-butyl amine was added at such a rate that the temperature did not exceed 42° C. due to the low boiling point of tert.-butyl amine. The reaction mixture was allowed to cool and was transferred to a separatory funnel. The lower aqueous phase was drained off and the top organic phase was separated and dried with anhydrous reagent magnesium sulfate and the product collected by filtration. The yield was 130 grams of a colorless liquid. This material was then dried a second time with anhydrous magnesium sulfate. NMR analysis confirmed that the product was predominantly 1,3,5-hexahydro-1,3,5-(tert.-butyl)triazine.

Sample B: The tert.-butyltriazine was prepared by slowly adding 3.0 moles of formaldehyde as 90.08 grams of solid paraformaldehyde to 3.15 moles (230.39 grams) of tert.-butyl amine with continuous stirring. The preparation was carried out in a round bottom reactor equipped with a mechanical stirrer, a water bath, and a thermometer. The temperature was controlled to about 43° C. or less. After addition and two (2) hours stirring, the stirring motor was turned off and the mixture was allowed to stand for several days. The reaction mixture was then placed into a separatory funnel and the lower aqueous layer was removed. The top organic layer was separated and fried with anhydrous magnesium sulfate and collected by filtration. The yield was 191 grams of clear colorless liquid. NMR analysis confirmed that the product was predominantly 1,3,5-hexahydro-1,3,5-(tert.-butyl)triazine.

Sample C-1: The sec-butyltriazine was prepared by slowly adding 2.1 moles (153.59 grams) of sec-butyl amine into 2.0 moles of formaldehyde as 165.31 grams of 37% formalin solution with continuous stirring. The preparation was carried out in a round bottom reaction flask equipped with an addition funnel, a magnetic stirrer, and a cooling bath. The sec-butyl amine was added at such a rate that the temperature did not exceed 42° C. The reaction mixture was allowed to cool and was transferred to a separatory funnel. The lower aqueous phase was drained off and the top organic phase was separated and dried with anhydrous reagent magnesium sulfate and the product collected by filtration. The yield was 140 grams of a clear light yellow liquid.

Sample C-2: The n-butyl triazine was prepared by slowly adding 2.1 moles (153.59 grams) of n-butyl amine into 2.0 moles of formaldehyde as 165.31 grams of 37% formalin solution with continuous stirring. The preparation was carried out in a round bottom reaction flask equipped with an addition funnel, a magnetic stirrer, and a cooling bath. The n-butyl amine was added at such a rate that the temperature did not exceed 40° C. The reaction mixture was allowed to cool and was transferred to a separatory funnel. The lower aqueous phase was drained off and the top organic phase was separated and dried with anhydrous reagent magnesium sulfate and the product collected by filtration. The yield was 153 grams of a white colorless liquid.

TESTS OF SCAVENGER (EXAMPLES)

Series I Tests:

Hydrogen sulfide scavenging tests were conducted by partially saturating kerosene with $H_2S$ gas at room temperature. The $H_2S$ in each sample was the same. The selected scavenger sample was added in neat form to the sample bottles. The bottles, each containing a scavenger sample, was shaken and the concentration of $H_2S$ in the vapor phase of each bottle was measured with elapsed time (at room temperature). The data are presented in TABLE II.

TABLE II

| Test No. | Sample | Scavenger | Active Scavenger Concentration (PPM) | $H_2S$ concentrate after 4.16 Hrs. |
|---|---|---|---|---|
| 1 | Blank | None | — | 3.7% |
| 2 | Blank | None | — | 4.6% |
| 3 | A | 1,3,5-hexahydro-1,3,5-(tert.butyl) triazine | 3,000 | 0.0% |
| 4 | B | 1,3,5-hexahydro-1,3,5-(tert.butyl) triazine | 3,000 | 0.0% |
| Comparative Tests: | | | | |
| 5 | C-1 | 1,3,5-hexahydro-1,3,5-(sec.butyl) triazine | 3,000 | 1.2% |
| 6 | C-2 | 1,3,5-hexahydro-1,3,5 (n-butyl) triazine | 3,000 | 1.6% |
| 7 | C-4 | MOPA-Triazine | 3,000 | 2.5% |
| 8 | C-5 | Commercial | 3,000 | 0.9% |

The TABLE II data reveal the 1,3,5-hexahydro-1,3,5 (tert.butyl) triazine to be the most effective scavenger tested. It is significant to note that the tert.-butyltriazines (Samples A and B) were much more effective than the n-butyl triazines and the sec-butyltriazines (Samples C-1 and C-2).

Series II Tests:

Aliquots of 500 ml each of a No. 6 fuel oil from a U.S. West Coast refinery were tested to determine the absorption capacity of the tertiary butyltriazine relative to the ability of several scavengers to reduce $H_2S$ vapor headspace concentrations. The Samples used in the experiments are identified on TABLE I. When possible, sour hydrocarbon samples were heated to simulate system temperatures. Vapor headspace concentrations were determined prior to treatment using Drager detector tubes.

Samples were then dosed with 216 ppm (actives) of an $H_2S$ abatement chemical additive using an eppendorf pipette, sealed in the container, shaken, and placed in a 130° F. (54.4° C.) water bath for two hours. One container served as a blank. Reductions in vapor headspace $H_2S$ concentrations were then determined after the heating cycle using fresh Drager detector tubes. Results are reported in TABLE III.

TABLE III

| | Headspace $H_2S$ (ppm) | | |
|---|---|---|---|
| Sample | Initial $H_2S$ Conc. | Final $H_2S$ Conc. | Amount $H_2S$ Consumed |
| Blank | 800 | 1175 | +375 (gain) |
| A | 850 | 225 | 625 |
| C-6 | 750 | 725 | 25 |
| C-7 | 775 | 900 | +125 (gain) |
| C-8 | 850 | 625 | 225 |

TABLE III-continued

| | Headspace $H_2S$ (ppm) | | |
|---|---|---|---|
| Sample | Initial $H_2S$ Conc. | Final $H_2S$ Conc. | Amount $H_2S$ Consumed |
| C-9 | 825 | 675 | 150 |
| C-10 | 700 | 410 | 290 |

Series III Tests:

The same procedure was followed as for Series II Experiments, except a Bubble Tower Heavy Gas Oil (BTHGO) was obtained from the same West Coast Refiner. The BTHGO was heated for one hour at 140° F. (60° C.). As before, initial concentrations were determined prior to treatment. Samples were then treated with 60 ppm chemical additive to reduce the $H_2S$ concentrations in the vapor headspace. Results are reported in TABLE IV.

TABLE IV

| | Headspace $H_2S$ (ppm) | | |
|---|---|---|---|
| Sample | Initial $H_2S$ Conc. | Final $H_2S$ Conc. | Amount $H_2S$ Consumed |
| Blank | 115 | 110 | 5 (loss) |
| Sample A | 145 | 45 | 100 |
| Sample C-5 | 130 | 60 | 70 |
| Sample C-9 | 145 | 75 | 70 |
| Sample C-3 | 125 | 35 | 85 |

Series IV Tests:

In these experiments, two sour distillate streams and a light cycle oil (LCO) from a Canadian refiner were used to determine the effectiveness of the tertiary butyltriazine. Historically, distillate streams 1 and 2 including LCO are difficult to treat due to reactive species competing for the $H_2S$ scavenger. Consequently, high dosages were required to reduce the $H_2S$ concentrations in the vapor space.

The same procedure was followed as used in the Series II Tests, except that a one hour heating cycle at 100° F. (37.7° C.) was used for distillate streams 1 and 2. A two hour heating cycle was used during the evaluation of the LCO. The streams were treated at three different dosages commonly utilized by the refiner. Results are reported in TABLE V.

TABLE V

| | | | Headspace $H_2S$ (ppm) | | |
|---|---|---|---|---|---|
| Sample | Stream | Dosage (ppmv) (Actives) | Initial $H_2S$ Conc. | Initial $H_2S$ Conc. | Amount $H_2S$ Consumed |
| Blank | 1 | 0 | 13 | 11 | 2 (loss) |
| A | 1 | 45 | 13 | 0 | 13 |
| C-11 | 1 | 45 | 16 | 19 | +3 (gain) |
| C-7 | 1 | 45 | 17 | 20 | +3 (gain) |
| C-9 | 1 | 45 | 11 | 4 | 7 |
| Blank | 2 | 0 | 48 | 44 | 4 (loss) |
| A | 2 | 90 | 58 | 0 | 58 |
| C-11 | 2 | 90 | 60 | 26 | 34 |
| C-7 | 2 | 90 | 49 | 11 | 38 |
| C-9 | 2 | 90 | 52 | 10 | 42 |
| Blank | LCO | 0 | 80 | 75 | 5 (loss) |
| A | LCO | 72 | 100 | 0 | 100 |
| C-11 | LCO | 72 | 115 | 85 | 30 |

TABLE V-continued

|  |  | Headspace H₂S (ppm) | | | |
| --- | --- | --- | --- | --- | --- |
| Sample | Stream | Dosage (ppmv) (Actives) | Initial H₂S Conc. | Initial H₂S Conc. | Amount H₂S Consumed |
| C-7 | LCO | 72 | 105 | 65 | 40 |
| C-9 | LCO | 72 | 100 | 52 | 48 |

Series V Tests: In this experiment, the same general procedure as used in the previous tests were employed, except sour FCC Cat Slurry Oil (CSO) was treated with chemical additives at 30 ppm (Actives). Produced FCC CSO, obtained from a Northeastern Refiner, is typically treated before going to tankage. The samples were heated to 190° F. (87.7° C.) and held at that temperature for two and a half hours. Results are reported in TABLE VI.

TABLE VI

|  | Headspace H₂S (ppm) | | |
| --- | --- | --- | --- |
| Sample | Initial H₂S Conc. | Final H₂S Conc. | Amount H₂S Consumed |
| Blank | 110 | 75 | 25 (loss) |
| A | 175 | 40 | 135 |
| C-6 | 115 | 43 | 72 |
| C-7 | 155 | 78 | 77 |
| C-9 | 170 | 53 | 117 |

The Series II, III, IV, and V Tests demonstrate the effectiveness of the 1,3,5-hexahydro-1,3,5-tert.-butyltriazines over other commercial scavengers under a variety of treating conditions and concentrations. Moreover, several different hydrocarbons, including crude oil, refined oil, CSO, BTHGO, and LCO were used in the comparative tests. A particular advantageous feature of the scavenger used in the method of the present invention is its fast reaction with the H₂S. The Series II, III, and IV Tests demonstrated effective scavenging within 1, 2, and 2.5 hours. An important property of the scavenger used in the present invention is its solubility in oil, which permits it to rapidly disperse in the sour oils.

What is claimed is:

1. A method of reducing H₂S in a hydrocarbon fluid which comprises contacting the fluid with an effective amount of a 1,3,5-hexahydro-1,3,5-tert.-butyl triazine, the concentration of the 1,3,5-hexahydro-1,3,5-tert.-butyl triazine in the fluid ranging from 50 to 3,000 ppm.

2. The method of claim 1 wherein the fluid is a gas or oil and the compound is introduced therein in an amount equal to 1 to 50 pounds of the triazine per pound of H₂S removed.

3. The method of claim 1 wherein the fluid is a gas stream or an oil stream.

4. The method of claim 1 wherein the triazine is introduced in neat form.

5. The method of claim 1 wherein the triazine is introduced into the hydrocarbon fluid with a hydrocarbon solvent or diluent.

6. The method of claim 1 wherein the concentration of the triazine in the fluid ranges from 50 to 1,000 ppm.

7. A method of reducing H₂S in a hydrocarbon fluid which comprises introducing into the fluid a scavenging amount of a scavenger formulation comprising (a) from 5 to 95 wt % of 1,3,5-hexahydro-1,3,5-tert.-butyltriazine, and (b) from 95 to 5 wt % of a diluent or solvent for the triazine.

8. The method of claim 7 wherein the hydrocarbon fluid is an oil stream.

9. The method of claim 7 wherein the triazine comprises from 20 to 80 wt % of the formulation.

* * * * *